O. ZERK.
LUBRICATING BOLT.
APPLICATION FILED MAY 27, 1913.
1,175,496. Patented Mar. 14, 1916.
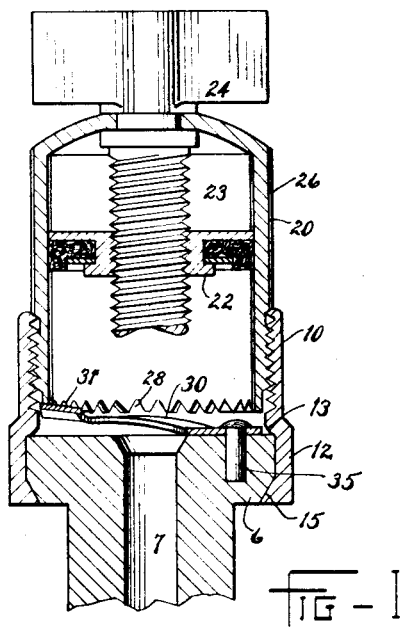
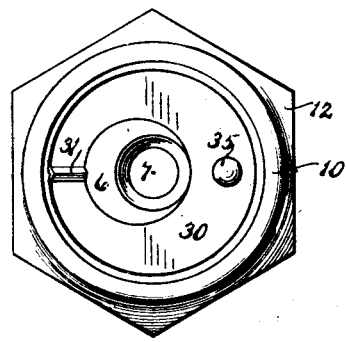
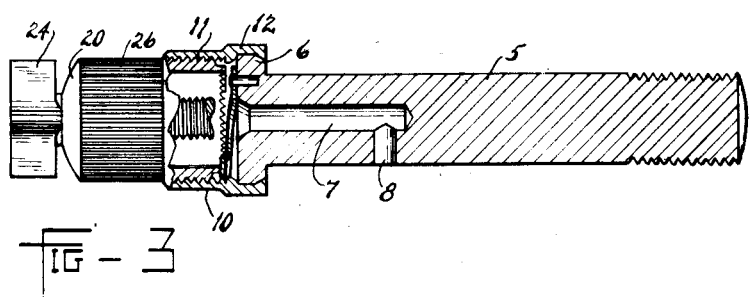
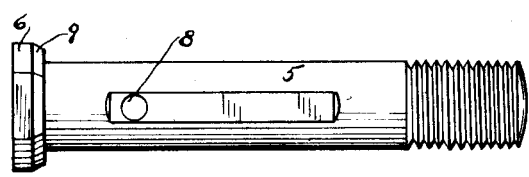
Witnesses
Inventor
Oscar Zerk

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

LUBRICATING-BOLT.

1,175,496.        Specification of Letters Patent.        Patented Mar. 14, 1916.

Application filed May 27, 1913. Serial No. 770,159.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Lubricating-Bolts, of which the following is a full, clear, and exact description, reference being had to the accompanying drawings.

This invention relates to lubricating bolts of the type wherein there is a grease cup carried at the head of the bolt. Such bolt may be conveniently employed, for example, in connecting the leaves and shackles of vehicle springs.

The general object of the invention is to simplify and cheapen the construction and render the device more efficient. This is accomplished by making the body portion of the bolt which provides the journal and the threaded flange thereon which carries the grease cup cap of separate pieces of metal suitably secured together, whereby the body may be conveniently case hardened, while the flange may be of unhardened material adapted to receive the thread. This and other features of the invention may be hereinafter more fully explained.

In the drawing, Figure 1 is an axial section of the head portion of the bolt with the grease cup in place thereon; Fig. 2 is a plan or end view of the bolt portion of the combined structure with the cap removed; Fig. 3 is a sectional side elevation of the complete structure, on a reduced scale; Fig. 4 is a side elevation of the bolt body alone.

Referring to the parts by numerals, 5 designates the body of the bolt, which is shown as a solid member having a head 6 near one end, a bore 7 leading axially inward from the head, and a lateral opening 8 from the bore to the periphery of the bolt, where it is preferably flattened. The head 6 has a polygonal periphery—for example, a hexagon. The planes bounding part of such polygonal head are parallel with the axis of the bolt, but at the inner corner of the head it is recessed or tapered, as shown at 9.

Surrounding the head 6 is a sleeve or flange 10, which extends in the opposite direction from the body and is provided with internal threads 11. The portion 12 of this sleeve which surrounds the angular head 6 of the body is made similarly angular; that is to say, both the head and sleeve are preferably hexagonal, the sleeve fitting snugly over the periphery of the head. The rounded portion 10 of the sleeve has preferably a smaller diameter than the smallest diameter of the portion 12, so that the annular shoulder 13 is provided, which bears against the outer face of the bolt head 6. Into the space provided by the tapered or recessed corner 6 of the bolt head the end portion of the sleeve 12 is forced by upsetting, as shown at 15. By this means the sleeve is cheaply and securely locked to the bolt body. The bolt body may be formed of suitable material and tempered or case hardened, and thereafter the flange of softer material secured thereon and the threads formed in the cylindrical portion of the sleeve after it is in place.

20, in Figs. 1 and 3, designates the grease cup cap, which has a substantially cylindrical wall with an external thread screwing into the thread 11. Within this cap are suitable means for forcing the grease toward the bore 7, the means shown comprising a plunger 22 in the cap and a screw 23 engaging the plunger and journaled in the cap and provided with a turning wing 24 above the cap.

To turn the cap into place, its exterior is suitably knurled, as indicated at 26. To lock it when in place I secure to the face of the head 6 a leaf spring 30, which has a projection 31 adapted to coact with notches 28 on the lower edge of the cap. This spring is preferably annular, or of washer-like form, as shown, described and claimed in my prior application No. 758,552. To provide convenient means for holding the spring on the hardened bolt head, I drill a hole in that head before it is hardened, and then, after the hardening, force a pin 35 through the hole in the spring and into the hole in the head to upset the end of the pin from the top of the spring, as shown in Figs. 1 and 2. A simple downward pressure accomplishes the insertion and upsetting of the pin.

Having thus described my invention, what I claim is:—

1. A lubricating bolt comprising a body portion having a head, a sleeve surrounding said head and secured thereto by upsetting the sleeve on upper and lower sides of the head, and a cap adapted to engage the sleeve.

2. In a device of the character described, the combination of a bolt body having a head, a sleeve having an enlarged portion surrounding the head and a reduced portion beyond the head providing a shoulder bearing against the face of the head, the sleeve being upset against the other face of the head to lock it to the body.

3. In a device of the character described, the combination of a bolt body having an angular head, a sleeve having an angular portion surrounding the head and a cylindrical portion extending from the angular portion, the angular portion being secured to the angular head and the cylindrical portion being provided with threads and a cap coacting with the thread.

4. In a device of the character described, the combination of a bolt having a body and an angular head, the corner of which adjacent to the body is reduced, a sleeve having an angular portion surrounding the head, the end of said sleeve being upset onto the reduced portion of the head.

5. In a device of the character described, the combination of a bolt body having an angular head with a reduced corner adjacent to the body, a sleeve having an angular portion surrounding the angular head and having a cylindrical portion of smaller diameter providing a shoulder bearing against the outer corner of the head, the end of the sleeve being upset into the reduced corner of the head.

6. In a device of the character described, the combination of a bolt body having a head, a separate sleeve surrounding the head and rigidly secured to it and provided with an internal thread, a cap screwing into said thread and having a notched lower edge, and a spring secured to the face of the head and coöperating with the notched edge of the cap.

In testimony whereof, I hereunto affix my signature in the presence of two witnesses.

OSCAR ZERK.

Witnesses:
 BRENNAN B. WEST,
 GERTRUDE K. SMITH.